(No Model.)
H. C. SWAN.
SPRING SHACKLE FOR VEHICLES.
No. 526,506. Patented Sept. 25, 1894.
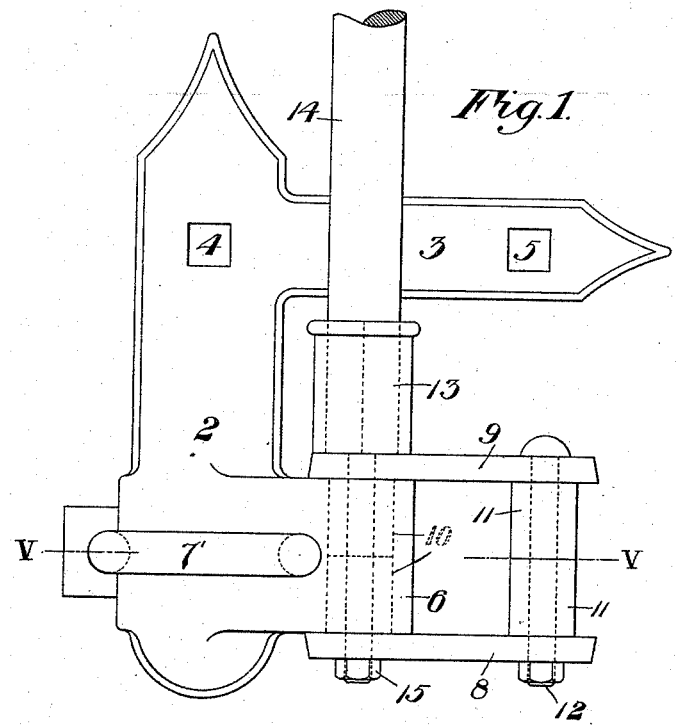
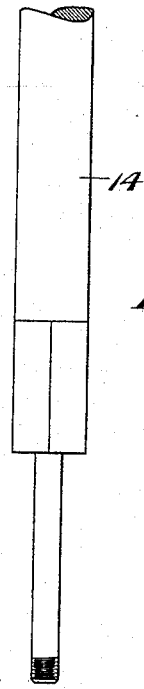
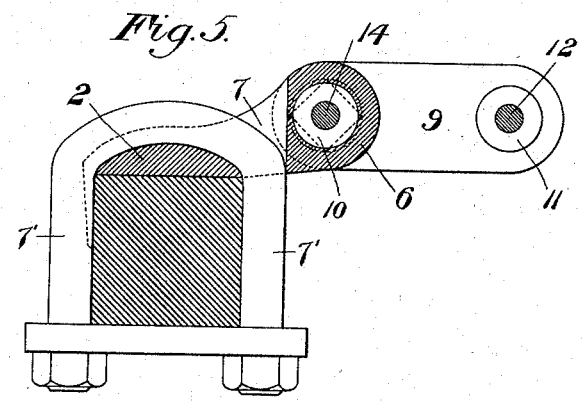
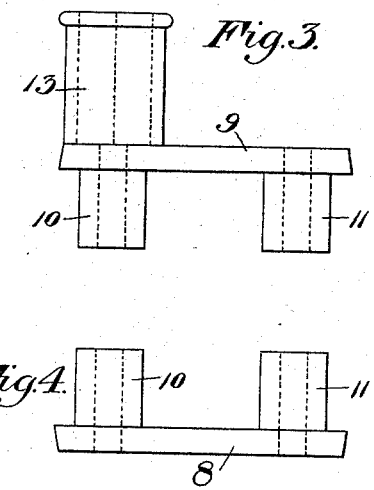
WITNESSES
INVENTOR
Henry C. Swan
by his Attorneys

UNITED STATES PATENT OFFICE.

HENRY C. SWAN, OF OSHKOSH, WISCONSIN.

SPRING-SHACKLE FOR VEHICLES.

SPECIFICATION forming part of Letters Patent No. 526,506, dated September 25, 1894.

Application filed November 21, 1893. Serial No. 491,554. (No model.)

*To all whom it may concern:*

Be it known that I, HENRY C. SWAN, of Oshkosh, in the county of Winnebago and State of Wisconsin, have invented a new and useful Improvement in Spring-Shackles for Vehicles, of which the following is a full, clear, and exact description, reference being had to the accompanying drawings, forming part of this specification, in which—

Figure 1 shows in plan view the axle and perch T-plate with spring shackle and spring equalizer applied thereto. Fig. 2 shows one end of the equalizer rod. Figs. 3 and 4 show in plan view the parts of the spring shackle. Fig. 5 is a vertical cross section on the line V—V of Fig. 1.

The object of my invention is to furnish a simple, compact and durable device for attaching side springs to the running gear of a vehicle. I have devised and illustrated the invention with special reference to its application to vehicles of the style known as the "Concord side-spring buggy," but I do not limit the same thereto, since it may be applied to many other vehicles having side springs, such, for example, as mountain wagons, four-spring wagons, &c.

In the drawings, 2 represents a plate, adapted to fit upon the top of the axle-stock (if my improvement is applied to the rear of the vehicle), or to the head-block or bolster if it is applied to the front thereof. This plate has an integral T-arm or extension 3 designed to fit upon the top of the perch and to form a brace-plate for the same, and has holes 4, 5, for the passage of bolts adapted to secure the plate to the perch and axle respectively.

6 is a spring-shackle-barrel, made integral with the plate 2, and 7 is a recess on the plate adapted to receive a clip 7' by which the plate is held to the axle, or a bolt may be passed through the plate, axle-stock and axle for the same purpose.

The spring shackle is constituted of two links or pieces 8, 9, each having projecting hollow barrels 10, 11. When the parts of the shackle are assembled, the barrels 10 fit inside the larger barrel 6, and the barrels 11 abut against each other, a bolt 12 being passed through said barrels 11 to hold the links together. The link 9 has at its end, on the opposite side from the barrel 8, a socket 13, with an internal square or angular recess adapted to receive the squared end of an equalizing rod 14, which connects the shackle with a similar shackle at the other side of the vehicle, so that every motion of one shackle will be communicated to the opposite shackle, and uniformity of action of the springs on both sides of the vehicle thus insured. The barrels 10 are held together by passing the equalizing rod 14 through them as shown in Fig. 1, and fitting it with a nut 15. This rod is therefore utilized both as an equalizing rod and as a shackle-link bolt.

A complete set of the irons shown in Fig. 1 comprises only four pieces. Should it be deemed desirable to construct the device without an equalizing rod, the shackle-link 9 may be constructed without the socket 13, and the rod omitted.

The advantages of my invention will be appreciated by those skilled in the art. Within the scope of my invention as defined in the broader claims, modifications may be made in the form, construction and relative arrangement of the parts, since

What I claim is—

1. An axle plate having a laterally projecting perch plate and a separate lateral shackle-barrel both of which are integral therewith and shackle links interfitting with the barrel, substantially as described.

2. A spring-shackle, comprising two side-links, each having inwardly projecting half barrels, and one of the links having an outwardly projecting squared socket for the equalizing rod, substantially as described.

3. A spring-shackle having separate side links, in combination with an equalizing rod extending through the side links and connecting them together as a bolt; substantially as described.

In testimony whereof I have hereunto set my hand.

HENRY C. SWAN.

Witnesses:
MARTIN O. SENSENY,
EMIL W. JAITE.